UNITED STATES PATENT OFFICE.

ALFRED O. TATE, OF TORONTO, ONTARIO, CANADA.

ART OF REJUVENATING STORAGE BATTERIES.

949,507.   Specification of Letters Patent.   Patented Feb. 15, 1910.

No Drawing.   Application filed May 12, 1908.   Serial No. 432,390.

*To all whom it may concern:*

Be it known that I, ALFRED O. TATE, a subject of the King of Great Britain, and resident of the city of Toronto, Province of Ontario, Dominion of Canada, have made a new and useful Invention in the Art of Rejuvenating Storage Batteries, of which the following is a specification.

My invention is directed particularly to a novel method or process of rejuvenating or renewing storage battery plates after they have become deteriorated by reason of continued oxidation during the act of charging, and has an especial application in connection with storage battery plates of the type disclosed in prior U. S. patents granted to me on the 25th day of February, 1908, and on the 29th day of June, 1909, in which the anodes and cathodes are of relatively thin narrow lead strips or ribbons, although my invention hereinafter described may be utilized generally in the art, either with relation to storage batteries of the applied oxid type, or of the Planté type; or of any type in which oxid on the anode plates is formed in the act of charging.

I have discovered that during the act of charging storage battery plates, particularly like those above referred to where the continuous charging effect is brought about by successively causing the charging current to flow always in the same direction, there comes a time when the anode strips are attacked by the current, producing lead oxid thereon, after the manner of the process of forming Planté plates, and the oxid on the cathode strips in like manner become converted into metallic lead, so that if this charging effect of the current be continued always in the same direction the anode strips will be all converted into lead oxid and, therefore, the internal resistance of the battery will be such as to preclude its practical use. My invention contemplates the prevention of this serious defect and I accomplish it, in storage battery plants, by installing a working battery of a given capacity, say one hundred cells, and provide in connection therewith an additional number of idle cells, say ten, all properly charged and ready for use, and I so arrange the plant that after a predetermined use based upon the work which the entire battery will be called upon to perform ten of the working cells will be cut out of circuit and the ten extra cells substituted therefor. The ten cells cut out are then charged up, by passing the charging current in a reverse direction from that used in previous charging, to their normal working capacity, and left ready for substitution for any ten cells it may be desired to cut out. Practice will determine by testing the internal resistances and general working conditions of these cells when any set of cells should be disconnected from the plant and a fully rejuvenated set substituted therefor. The safety period having once been determined by careful comparison and measurements I would divide the same into ten equal periods of time, say one month each, so that in practicing my method the percentage of working cells will be cut out and the like percentage of rejuvenated cells substituted therefor, say once each month, so that while the substituted cells are working, the disconnected cells, as above indicated, will be subjected to the reversal action of the charging current until fully charged and ready for substitution. At the end of the second period of one month a like percentage of cells in the working battery will be cut out and those previously rejuvenated or renewed will be substituted therefor, and this alternating substitution will be continued from time to time in accordance with the proper period previously obtained, as before stated, by careful comparisons and measurements. It will thus be seen that by pursuing this process it is possible to establish a practically inexhaustible life of storage battery cells which become deteriorated by reason of continuous charging always in the same direction while in actual use.

In effecting the successive steps of this process I may utilize a series of properly constructed switches and bus-wires or interconnecting conductors, such as will readily suggest themselves to those skilled in the art, whereby the substitution and charging may be effected.

I do not limit my invention to use with storage battery plates of the Faure or applied oxid type as obviously the same may be used in connection with storage battery plates generally in which the charging effect thereon is brought about by oxidation, my invention being designed particularly to overcome the evil effects of continuous oxidation produced successively by the action of the charging current flowing in the same direction through the conducting part of the anode strips or plates to such an extent as to materially increase the internal resistance of the cells.

I make no claim hereinafter to the broad method or process of converting an oxid which has been formed upon the conducting part of the anode strips or faces of a storage battery plate by continued charging in the same direction into metallic lead, by reversing the action of the current, and in likewise reconverting the metallic lead which has been deposited on the cathode strips or faces by reason of such continuous charging always in the same direction into oxid of lead, as this feature constitutes the subject matter of a separate application filed of even date herewith and bearing Serial No. 432,391.

Having thus described my invention what I claim and desire to secure by Letters Patent of the United States is—

1. The method or process of giving increased life to a storage battery plant which consists in disconnecting such of the cells at stated intervals as have become deteriorated, owing to the presence of an abnormal quantity of oxid upon the anode plates thereof through continuous charging in the same direction; substituting therefor a like number of cells of normal or original efficiency which have been charged while disconnected, and in subjecting the disconnected cells to a charging current flowing in a reverse direction to that used when previously charged.

2. The method or process of giving increased life to a storage battery plant, consisting in cutting out at stated intervals a definite percentage of the cells and substituting therefor a like percentage of similar cells which have been previously charged to their normal or original efficiency; then fully charging the disconnected cells, through the action of a current flowing in a reverse direction to that utilized in previously charging them, until they shall have assumed their normal or original efficiency.

3. The method or process of giving increased life to a storage battery plant, consisting in cutting out at stated intervals a definite percentage of the cells and substituting therefor a like percentage which have been previously charged to their normal or original efficiency; then fully charging the disconnected cells, through the action of a current flowing in a reverse direction to that utilized in previously charging them and in successively continuing this substitution and operation in sequence throughout the entire system of cells, until they shall have assumed their normal or original efficiency.

4. The method or process of giving increased life to a storage battery plant, consisting in determining by successive tests which of the cells have become deteriorated by successive charging always in the same direction, and in substituting therefor a properly rejuvenated cell or cells; then subjecting the disconnected cell or cells to a charging current flowing in a reverse direction to that previously used in charging the same.

5. The method or process of giving increased life to a storage battery plant, consisting in determining by successive tests which of the cells have become deteriorated by successive charging always in the same direction, and in substituting therefor a properly rejuvenated cell or cells; then subjecting the disconnected cell or cells to a charging current flowing in a reverse direction to that previously used in charging the same until it or they shall have assumed the normal or original efficiency and in successively continuing this substitution and operation in sequence throughout the entire system of cells.

In testimony whereof I have signed my name to this specification in the presence of two subscribing witnesses.

ALFRED O. TATE.

Witnesses:
WILLIAM W. SLOAN,
HELEN MACINTOSH.